United States Patent
Isella

Patent Number: 6,076,899
Date of Patent: Jun. 20, 2000

[54] METHOD AND APPARATUS FOR CONTROLLING THE BRAKE SYSTEM OF ELECTRIC DRIVE VEHICLES

[75] Inventor: Thomas Isella, Markgroeningen, Germany

[73] Assignee: Robert Bosch GmbH, Stuttgart, Germany

[21] Appl. No.: 08/902,780

[22] Filed: Jul. 30, 1997

[51] Int. Cl.$^7$ ..................................................... B60L 7/10
[52] U.S. Cl. .............................. 303/152; 303/3; 188/159
[58] Field of Search ..................................... 188/156, 159; 303/3, 152

[56] References Cited

U.S. PATENT DOCUMENTS

| | | | |
|---|---|---|---|
| 3,621,929 | 11/1971 | Oberthur | 188/156 |
| 5,433,512 | 7/1995 | Aoki et al. | 303/3 |
| 5,450,324 | 9/1995 | Cikanek | 364/426.02 |
| 5,472,264 | 12/1995 | Klein et al. | 303/3 |
| 5,476,310 | 12/1995 | Ohtsu et al. | 303/3 |

FOREIGN PATENT DOCUMENTS

| | | | |
|---|---|---|---|
| 2282651A | 12/1995 | United Kingdom | B60T 13/74 |
| 9301959 | 2/1993 | WIPO . | |

*Primary Examiner*—Mark T. Le
*Assistant Examiner*—Robert A. Siconolfi
*Attorney, Agent, or Firm*—Fulbright & Jaworski, LLP

[57] ABSTRACT

A method and an apparatus for controlling the brake system of electric drive vehicles are proposed, in which the control of a friction brake and of an electric regenerative brake is divided between two pedals. The regenerative brake is controlled as a function of the actuation of the accelerator, independently of the extent to which the brake pedal is actuated.

7 Claims, 3 Drawing Sheets

6,076,899

METHOD AND APPARATUS FOR CONTROLLING THE BRAKE SYSTEM OF ELECTRIC DRIVE VEHICLES

BACKGROUND OF THE INVENTION

The invention pertains to a method and to an apparatus for controlling the brake system of electric drive vehicles according to the introductory clauses of the independent claims.

A brake system for motor vehicles with electric drive is known from WO-A 93/01,959, in which a conventional friction brake and a regenerative brake acting via the drive motor or motors of the vehicle are used for braking. When the brake pedal is actuated, the ratio between the braking force of the regenerative electric brake and that of the conventional friction brake is determined in such as way as to optimize the energy recovery via the regenerative brake. In addition, the action of the regenerative brake is modified as a function of the release rate of the accelerator in such a way as to simulate the action of the drag torque known from conventional vehicles which occurs when the accelerator is released.

Because, in the prior art solution, modifications are made to the actions of both the friction brake and the electric regenerative brake during a braking process, complicated measures are required to ensure that the modifications of the actions of these two types of brakes during the braking process are coordinated with each other and so that the influences which they exert on each other are taken into account.

The task of the invention is to simplify the control of a brake system of electric drive vehicles with both friction and electroregenerative brakes without the occurrence of any significant impairment to the energy recovery during the deceleration of the vehicle.

This goal is achieved by means of the invention herein.

SUMMARY OF THE INVENTION

The invention herein provides a control of the brake system of an electric drive vehicle which works without complicated measures with respect to the actuation of the electroregenerative and conventional friction brakes. In particular, complicated and difficult multi-variable automatic control is avoided, and the two automatically controlled brake systems in the vehicle (friction brake, electric brake) operate with little or no interference with each other.

It is also advantageous that braking is accomplished either electrically or conventionally. As a result, there are no difficulties in managing the volume of the conventional friction brake (hydraulic), because there is no need to displace a volume of pressure medium so that a certain travel of the brake pedal coordinates with a certain deceleration. The deceleration generated by the electroregenerative brake is produced by way of the accelerator, whereas the deceleration generated by the friction brake is produced by way of the brake pedal.

It is especially advantageous that the driver has the possibility of specifying his braking command by the use of the accelerator, the electric brake serving in this case as the basic brake. The driver needs to use the conventional friction brake only if the electric brake does not provide sufficient deceleration.

Other objects and advantages can be derived from the following specification, and the scope of the invention will be set forth in the claims.

DRAWING

The invention is explained in greater detail below on the basis of the exemplary embodiments illustrated in the drawing.

Figure 3A:
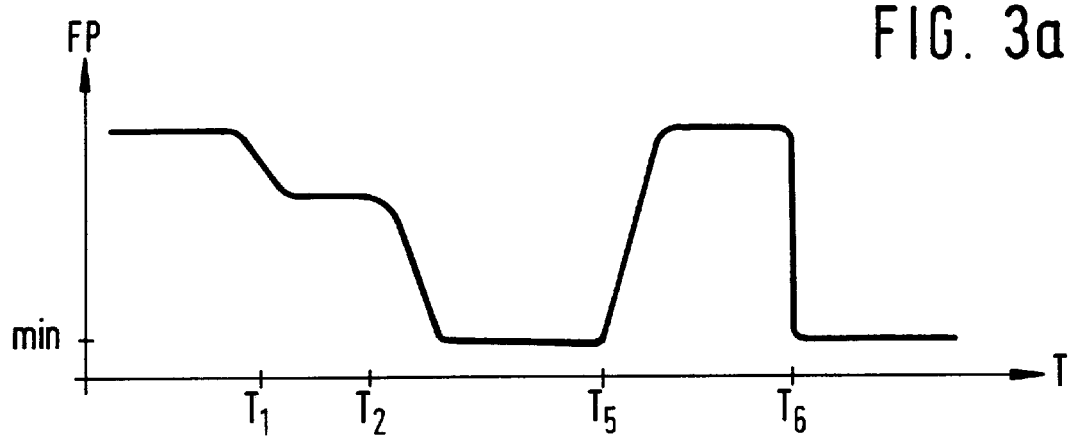
Figure 3B:
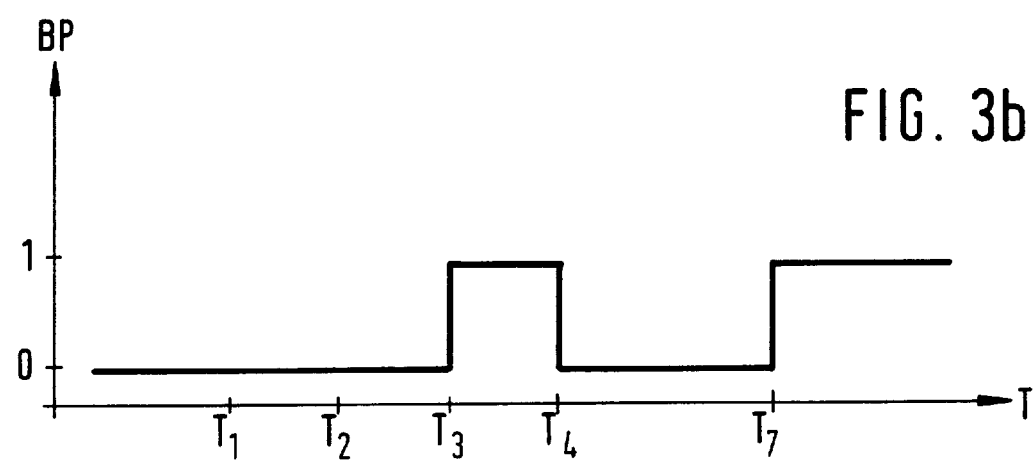
Figure 3C:
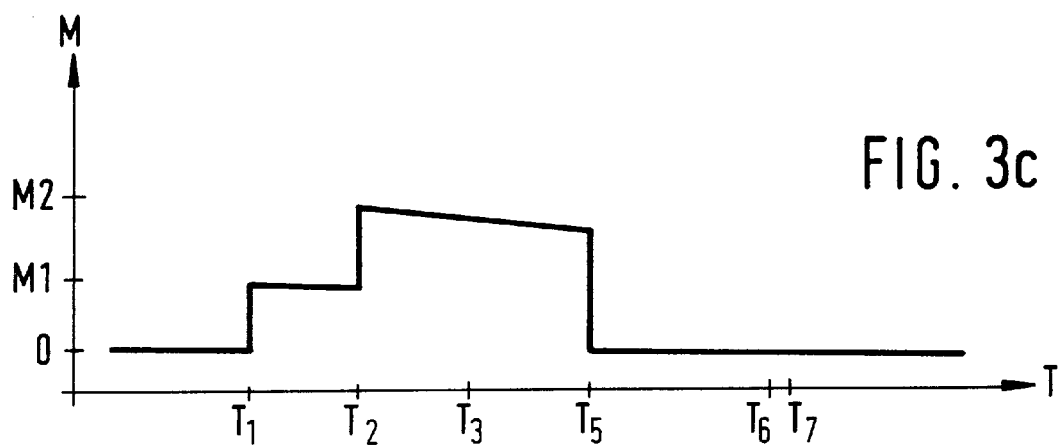

FIGS. 3a, 3b, and 3c, show the solution according to the invention on the basis of time diagrams.

DETAILED DESCRIPTION OF EXEMPLARY EMBODIMENTS

Figure 1:
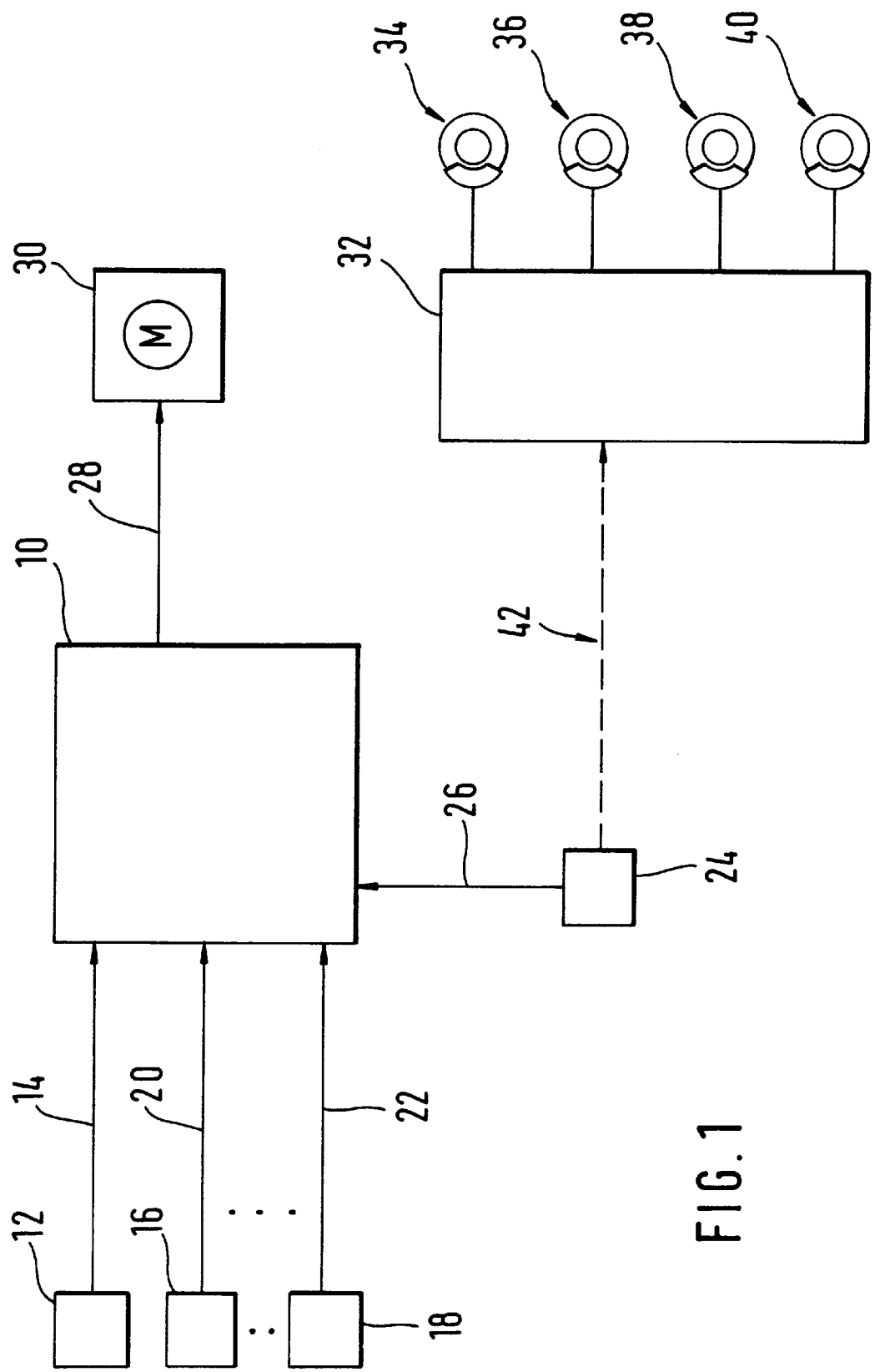
FIG. 1 shows an overall circuit diagram of a control unit for a brake system of a vehicle with electric drive.

FIG. 1 shows a control unit 10 for the brake system of a vehicle with electric drive. An input line 14 to control unit 10 leads from a measuring device 12 for detecting the position of the accelerator; input lines 20–22 lead to the control unit from measuring devices 16–18, which detect additional operating variables of the drive unit and/or of the vehicle such as rpm's, wheel velocities, etc.; and an input line 26 leads to the control unit from a measuring device 24 for detecting the actuation of the brake pedal. By way of an output line 28, control unit 10 controls electric drive motor or motors 30 at least with respect to the braking operation and, in an exemplary embodiment, it also controls them in drive mode. In addition, a conventional friction brake system 32 for wheel brakes 34, 36, 38, 40 of the vehicle is provided, which is actuated by brake pedal 24 acting by way of an electric, hydraulic, or pneumatic actuating connection 42.

The basic idea of the solution according to the invention is the division of the brake control between two different pedals. The electric regenerative brake is controlled by the accelerator, in that an appropriate sensor for detecting the position of the pedal and an evaluation circuit are used to determine the way in which the driver decreases the drive power. If, for example, the accelerator is allowed to return at high speed or at a high rate of acceleration, the evaluation circuit will recognize the desire for a correspondingly high degree of deceleration, and this will then be produced by the electric brake. If, in contrast, the accelerator is allowed to return very slowly, the evaluation circuit will produce only a small degree of deceleration or none at all. If the driver releases the accelerator very quickly and shortly thereafter actuates the brake pedal, it will be assumed that a dangerous situation is present. In this case, the electric brake will not produce any deceleration or only a very small degree thereof or the deceleration of the electric brake will be slowly decreased. On actuation of the brake pedal, no additional deceleration is produced by the electric brake. The electric brake therefore operates as the basic brake, comparable to the engine brake in heavy trucks. In an advantageous exemplary embodiment, it is possible to use an additional switch instead of the accelerator to actuate the electric brake. On actuation of the brake pedal, the electric brake remains active until it is turned off by an antilock controller or has been adjusted to a predetermined value. In the preferred exemplary embodiment, the friction brake is a hydraulic brake system with a conventional antilock system. The antilock system takes over the job of monitoring the slip of the wheels and gives the electric brake the command to turn off its braking action or to adjust its braking action to a certain value. This transition occurs preferably by way of a time ramp function so as to ensure a jerk-free transition without any discontinuity in the deceleration process. In an advantageous exemplary embodiment, the electric brake is also controlled in a similar manner when the driver actuates the brake pedal. Through the adjustment of the braking action of the electric brake to a predetermined value, the way in which the braking force is distributed upon actuation of the brakes can be specified as desired.

Figure 2:
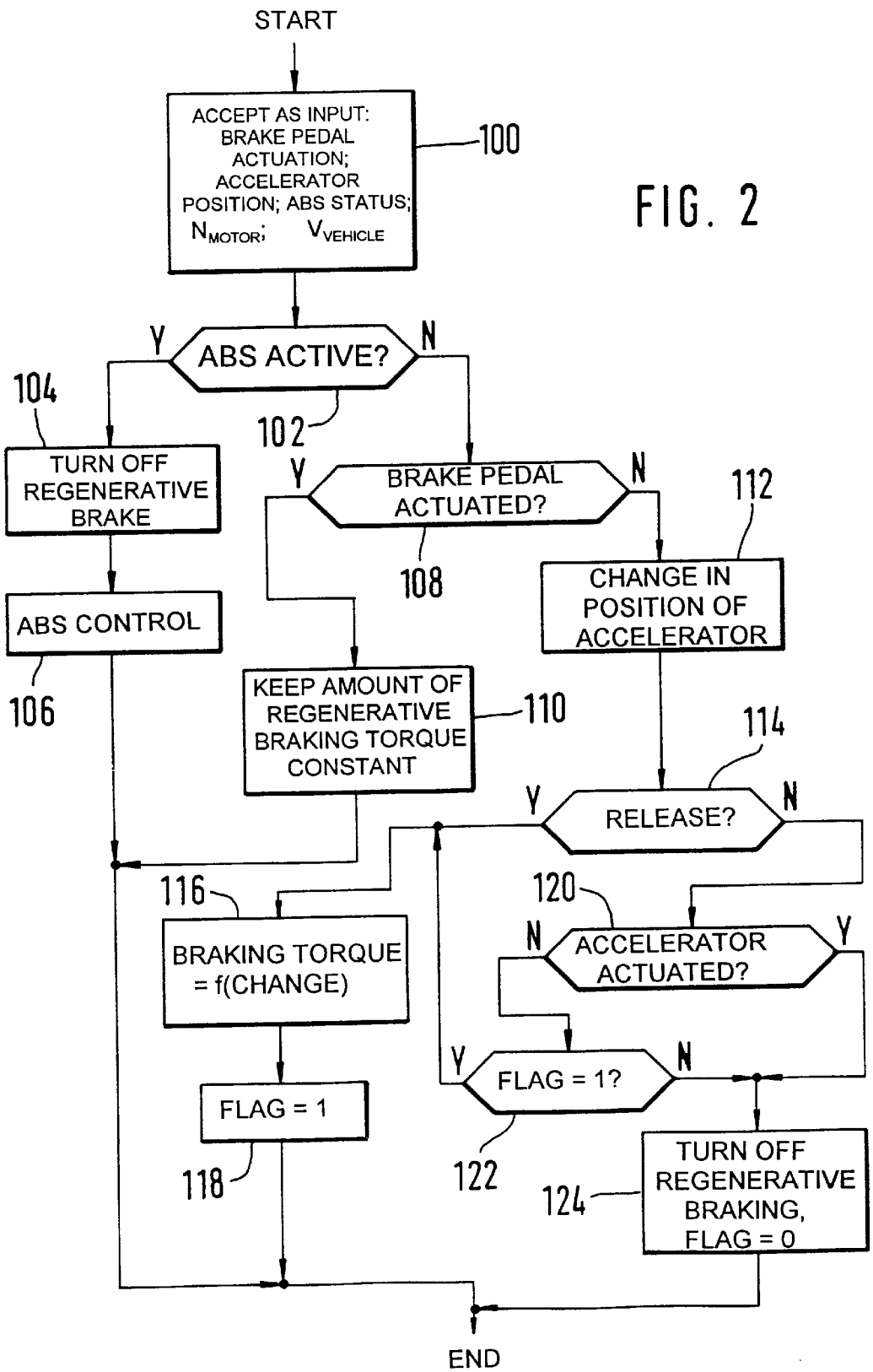
FIG. 2 shows the solution according to the invention in a preferred exemplary embodiment as a computer program running on a microcomputer.

In the preferred exemplary embodiment, the solution according to the invention is realized as a program running on a microcomputer in control unit 10. A preferred example of a program such as this is described on the basis of the flow chart of FIG. 2. The subprogram illustrated there is started at predetermined times, such as every 10–100 msec.

In a first step 100, the operating variables required for implementing the solution according to the invention are accepted as input. These include at least the variable representing the actuation of the brake pedal (the status of a brake pedal switch, the degree to which the brake pedal has been actuated, etc.), a variable representing the position of the accelerator, a variable representing the status of the antilock controller (active or not active), and possibly a variable representing the rpm's of the drive motor or motors and/or the velocity of the vehicle. In the next step, i.e., request-for-input step 102, the status of the antilock controller is checked. If it is active, then in step 104 the regenerative brake is turned off or its braking action adjusted to certain value and, in step 106, the antilock control is implemented in the manner known in and of itself. Then the subprogram terminates and is repeated after the specified time interval. If the antilock controller is not engaged, then the program checks in question step 108 to see whether or not the brake pedal is being actuated. If the brake pedal is being actuated and the driver is decelerating the vehicle by way of the conventional friction brake, then in step 110 the braking torque of the regenerative brake which has been produced is not changed. In some embodiments, furthermore, the braking force distribution of the conventional friction brake can, through appropriate control of the pressure, take into account this braking torque, i.e., the torque which is applied by the regenerative brake and which usually acts only on the drive axle. In another embodiment, the braking torque of the electric brake is adjusted to a predetermined value, and this one predetermined braking force distribution is maintained. The subprogram then ends after step 110.

If it is found in step 108 that no braking process associated with the actuation of the brake pedal is present, in step 112 the change in the position of the accelerator, that is, the speed at which the accelerator changes its position, is determined by differentiation of the accelerator position signal or by comparison of the accelerator position signals from two runs of the program. Then the program determines in step 114 whether or not the driver is allowing the accelerator to return. If he is, this return of the accelerator is interpreted in accordance with the solution according to the invention as the desire to brake.

Therefore, in step 116, the braking torque to be produced by the regenerative brake is determined from a characteristic diagram, a characteristic curve, or a table as a function of the rate at which the driver allows the accelerator to return. Additional operating variables such as the absolute position of the accelerator after its return, the rpm's of the drive motor or motors, and/or the velocity of the vehicle can also be considered in the determination of the braking torque to be produced by the regenerative brake. In a preferred exemplary embodiment, the braking torque depends on the operating variables in the following ways. A slow return rate of the accelerator leads to a slight braking action by the regenerative brake. As the return rate increases, the braking torque to be produced increases. If the accelerator is released very quickly and then the brake pedal is actuated, then little or no braking action is produced by the regenerative brake.

A further improvement consists in that the last-named dependence is considered present only when the program recognizes a very rapid release all the way to complete separation of the foot from the accelerator. In addition, it is usually provided in the preferred exemplary embodiment that, after the return, the braking action is increased as the absolute value of the position of the accelerator becomes smaller (at the same speed of release of the accelerator pedal). In other words, in two situations where the driver releases the accelerator pedal at equal speeds, the braking action will be greater where the distance of depression of the accelerator pedal is lesser. Where the driver completely releases the accelerator pedal (i.e., depression of the pedal is zero), the braking action will be at its maximum. It can also be provided in an advantageous exemplary embodiment that, the greater the driving speed and the greater the rpm's of the drive motor, the greater the braking torque produced by the regenerative brake. The braking torque determined in step 116 is then produced by sending the appropriate actuating current to the drive motor or motors; and, in step 118, a flag is set to a value of 1. The subprogram ends at this point and is repeated at the specified time.

If step 114 has shown that the accelerator has not been released, then the program checks in step 120 to see whether or not the accelerator has been actuated to increase the power. If this is not the case, the program checks in step 122 to see whether the flag has the value of 1. If so, in step 116 the braking torque is determined according to the current values of the return rate and possibly the accelerator position, the rpm's of the motor, and/or the velocity of the vehicle, whereupon the process continues with step 118. If it has been found in step 122 that the flag has a value of 0 or if step 120 has shown that the accelerator has been actuated so as to increase the power of the drive motor, then in step 124 the braking action of the regenerative brake, insofar as any has been produced, is turned off and the flag is set back to zero. The drive power of the vehicle is then produced on the basis of the driver's command by corresponding control of the drive motor or motors. The subprogram terminates after step 124 and is repeated after the specified interval.

The solution according to the invention is illustrated in FIGS. 3a, 3b, and 3c on the basis of time diagrams. FIG. 3a shows an example of the change over time in the position of the accelerator. FIG. 3b shows the change over time in the actuation of the brake pedal. And FIG. 3c shows the change over time in the braking torque M produced by the regenerative brake.

First, the driver actuates the accelerator so that the vehicle moves at a certain speed. At time $T_1$, the driver lets the accelerator return to a smaller value at a slow rate of speed. This means that, at time $T_1$, a small braking torque $M_1$ is generated by the regenerative brake, which is possibly modified up until time $T_2$ in accordance with additional operating variables. Let us assume that the position of the accelerator remains the same during this period of time. At time $T_2$, the driver now allows the accelerator to return all the way at a faster rate of release. This means that, at time $T_2$, the regenerative brake will build up additional braking torque ($M_2$). The vehicle thus decelerates as a result of the release of the accelerator. At time $T_3$, the driver actuates the brake pedal and thus the conventional friction brake. This leads to a situation in which the amount of braking torque generated by the regenerative brake is not changed depending on the depression of the brake pedal. The amount of brake torque may decline slightly due to the deceleration of the vehicle as shown, between points $T_2$ and $T_5$. At time $T_4$, the driver releases the brake pedal, so that, at this point, the braking torque curve calculated in the time period between $T_2$ and $T_3$ is established again. Now, however, the driver actuates the accelerator again at time $T_5$ to accelerate the vehicle. This has the result that, starting at time $T_5$, no more torque is built up by the regenerative brake. At time $T_6$, the driver releases the accelerator abruptly. At time $T_7$, the driver actuates the brake pedal, with the result that a very small braking torque is generated by the regenerative brake.

It can be seen that the regenerative brake of the vehicle serves as the basic brake and is controlled by the driver as a function of how the accelerator is actuated. The actuation of the brake pedal leads to no additional influence on the regenerative brake. Correspondingly, the two brake controls are essentially independent of each other, so that, in the design of the automatic controls, there is no need to take into account the possibility of their interfering with each other.

The braking action produced by the electroregenerative brake is adjusted by the closed-loop or open-loop control of the braking torque, the braking force applied by the brake, the actuation current, etc.

What is claimed is:

1. Method for controlling the braking system of an electrically driven vehicle having a friction brake system and a regenerative braking function via the drive motor of the vehicle, registering the extent of take-back of the vehicle accelerator pedal, registering the activation of the vehicle brake pedal, adjusting the braking effect applied by regenerative brake to be dependent on the extent of take-back of the accelerator pedal and to be independent of the extent of activation of the brake pedal, and adjusting the braking effect of the friction brake to be dependent on the extent to which the brake pedal is depressed, and to be independent of the actuation of the accelerator.

2. Method according to claim 1, wherein the regenerative brake is controlled as a function of the rate at which the accelerator is released.

3. Method according to claim 1, wherein the regenerative braking action produces a braking torque which increases as the rate at which the accelerator is released increases.

4. Method according to claim 1, wherein, when rate of release of the accelerator exceeds a predetermined threshold and the brake pedal is subsequently actuated, no braking action is produced by the regenerative brake.

5. Method according to claim 1, said controlling of the regenerative brake being additionally dependent on at least one of the following indicia consisting of the group of: the antilock controller of the vehicle, the rpms of the drive motor, the position of the accelerator, or the velocity of the vehicle.

6. Method according to claim 1, wherein, when the brake pedal is actuated, the regenerative braking action remains unchanged or is produced at a predetermined level.

7. Apparatus for controlling the brake system of an electrically driven vehicle having both a friction brake system and a regenerative brake acting on at least one of the drive motors of the vehicle, said apparatus comprising:

at least one control unit which registers the extent of take-back of the accelerator pedal and the extent to which a brake pedal is activated, the control unit adjusts the braking effect applied by the regenerative brake to be dependent on the extent of take-back of the accelerator pedal and to be independent on the extent to which the brake pedal is actuated, and the control unit further adjusts the braking effect of the friction brake to be dependent on the extent of activation of the brake pedal and to be independent on actuation of the accelerator.

* * * * *

UNITED STATES PATENT AND TRADEMARK OFFICE
CERTIFICATE OF CORRECTION

PATENT NO.   : 6,076,899
DATED        : June 20, 2000
INVENTOR(S)  : Thomas Isella It is certified that error appears in the above-identified patent and that said Letters Patent is hereby corrected as shown below:

<u>Title page,</u>
In the section entitled <u>U.S. Patent Documents,</u> insert
-- 5,322,352     6/1994          Ohno 303/3 --.

Signed and Sealed this

Eleventh Day of September, 2001

Attest:

NICHOLAS P. GODICI
*Attesting Officer*     *Acting Director of the United States Patent and Trademark Office*